July 24, 1962    J. H. LOBECK ETAL    3,046,066
SPHERICAL ROLLER BEARING WITH BIPARTITE RETAINER
Filed Dec. 23, 1960

JOHN H. LOBECK
WALTER FISHER JR.
INVENTORS

BY *Mason, Porter, Miller & Stewart*

ATTORNEYS

United States Patent Office 3,046,066
Patented July 24, 1962

3,046,066
SPHERICAL ROLLER BEARING WITH
BIPARTITE RETAINER
John H. Lobeck and Walter Fisher, Jr., South Bend, Ind.,
assignors to Bantam Bearing Division, The Torrington
Company, South Bend, Ind.
Filed Dec. 23, 1960, Ser. No. 78,065
8 Claims. (Cl. 308—217)

The following specification relates to a novel, spherical roller bearing with bipartite retainer.

Self-aligning spherical roller bearings are commonly designed with a center guide flange. When this is a part of the inner bearing member, the necessary result is a limitation in the capacity of the load that may be handled or in the durability and length of life of the bearing. The present invention is an improvement in increasing the capacity of the bearing.

It is an object of this invention to employ truly symmetrical rollers of maximum length within the over-all dimensions of the bearing unit.

One of the objects of the invention is to utilize the improved retainer to guide the rollers at the inward ends.

A further object of the invention is to combine the guidance of the rollers with provision for independent relative movements between the separate retainer members and the two series of rollers.

A still further object of the invention is to provide adequate guidance and spacing of the series of rollers without necessity of using a central guide rib on the inner bearing member.

Other objects of the invention will be evident from the following description of the preferred form of the invention as illustrated on the accompanying drawings in which FIG. 1 is a fragmentary side elevation partly in transverse section of the improved bearing including retainer;

Figure 1:
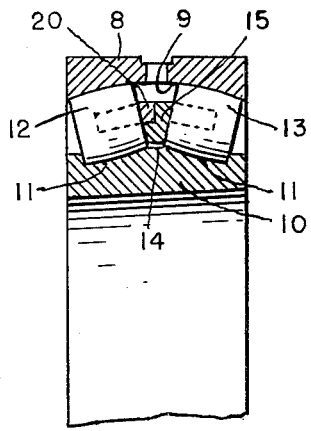

The improved bearing essentially provides for a retainer for both series of spherical roller bearings which gives each series relative freedom of movement. The series of bearing rollers are maintained adequately spaced on their respective tracks or paths. At the same time they are free to move independently at different rotating speeds dependent upon the condition of radial or thrust loading.

This is accomplished by providing a main or dominant retainer ring which has a sliding or floating bearing upon the land between the raceways of the inner bearing member. This retainer ring is provided with spaced, laterally extending fingers which serve as spacers between adjacent rollers of one series. These fingers may have straight sides or be curved to conform to the contour of the rollers.

The opposite series of rollers is also held by a second ring having similar fingers. This second ring is seated in a seat on the side wall of the first named ring. The two rings may rotate at different speeds.

In the drawings the outer bearing ring 8 is of the usual type having a spherical raceway 9.

The inner bearing member 10 has two inclined spherical raceways or tracks 11, 11, each of which supports a separate series of bearing rollers 12 and 13. These bearing rollers are truly symmetrical.

It will be noted that the raceways 11, 11 are separated by a land 14 which, however, does not project above the adjacent surfaces of the raceways.

The dominant or principal part of the retainer is a spacing ring 15 sliding or floating on the land 14. This has sloping or flaring side walls 16, 17. These side walls are abutments for the adjacent spherical ends of the rollers 12 and 13.

The outer side wall 17 of the ring 15 carries a series of fingers 18. These fingers extend laterally and slope inwardly toward the axis of the ring. The fingers 18 may have straight sides or if desired may be made concave to fit closely around the curved sides of the rollers 12 and 13.

The inner side 16 of the ring 15 is rabbeted to form a seat or step. This is substantially opposite the inner walls of the fingers 18.

A secondary retaining ring 20 is provided of suitable proportions to fit on the seat 19 and to fill the latter so that the side wall 16 is coextensive with the side wall 17.

Figure 3:
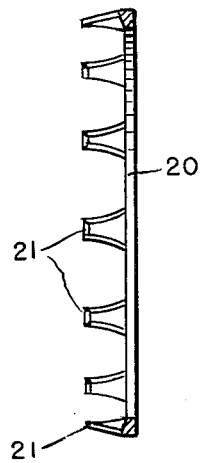
FIG. 3 is a similar view of the opposite retainer ring.

A series of fingers 21 are provided to project laterally for the full width of the ring 20. These fingers slope inwardly as shown in FIG. 3. The fingers 21 correspond in size, dimensions, arrangement and purpose with the corresponding fingers 18 on the ring 15.

Figure 2:
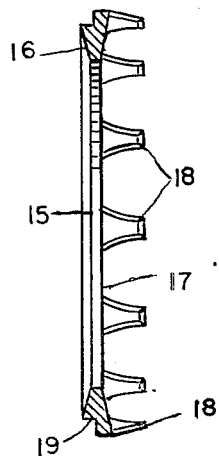
FIG. 2 is a vertical transverse section of one retainer ring.
Figure 5:
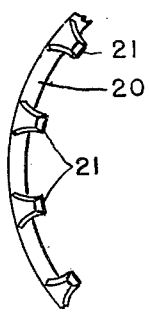
FIG. 5 is a similar enlarged front view of the opposite ring.
Figure 4:
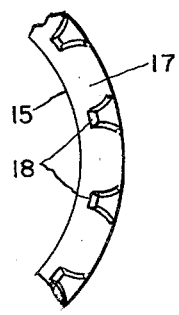
FIG. 4 is a fragmentary enlarged front view of the ring shown in FIG. 2.
Figure 6:
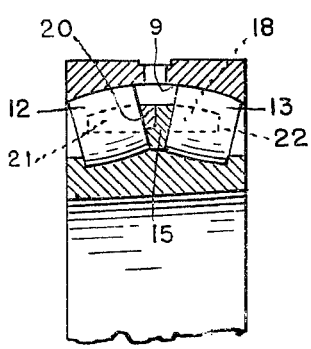
FIG. 6 is a transverse section of a modified form of the bearing.

In the modified form shown in FIG. 6, the inner surfaces of the fingers 18 and 21 lie in a common plane as indicated at 22. In each instance the outer sides of the fingers 18 and 21 may either be straight as shown in FIGS. 2 or 3 or curvilinear as shown in FIGS. 1 and 6 to conform to the curvature of the outer raceway 9.

The parts of this retainer may be made of a suitable type of iron that can be easily machined. However, they also may be made by molding or casting of light metal, or suitable resinous compositions.

A spherical roller bearing as illustrated and described, provides the advantage of increasing greatly the length of the rollers in proportion to the over-all dimensions of the bearing. Thus increased capacity or load is provided.

One contributing factor to this result is the elimination of the center land from the inner raceway and the use of the ring 15 as a spacer between the series of rollers.

Wherever the load may demand, the bearing rings 15 and 20 move relatively to each other so that the rate of rotation of one series of rollers may differ from that of the opposite series.

The above description has been given of the preferred form of the invention, although it is to be understood that minor changes in materials and proportions may be made without departing from the scope of the invention as defined in the following claims.

What is claimed is:

1. A spherical roller bearing comprising an outer member with a spherical raceway, an inner member with two spaced concave raceways opposite said spherical raceway, said inner member having a central land intersecting said concave raceways, two series of spherical rollers each engaging the outer raceway and one inner raceway, a retainer sliding on the land between said series of rollers, said retainer having a plurality of spacing fingers for one series of rollers, a seat on the retainer, a ring slidably carried in said seat and a plurality of spacing fingers on said ring for the second series of rollers.

2. A spherical roller bearing comprising an outer member with a spherical raceway, an inner member with two spaced concave raceways opposite said spherical raceway, said inner member having a central land intersecting said concave raceways, two series of spherical rollers each engaging the outer raceway and one inner raceway, a retainer slidably carried on the land of the inner member between its raceways, said retainer having a plurality of spacing fingers for one series of rollers, a seat on the retainer, a ring slidably carried in said seat and a plurality of spacing fingers on said ring for the second series of rollers.

3. A spherical roller bearing comprising an outer member with a spherical raceway, an inner member with two spaced concave raceways opposite said spherical raceway, said inner member having a central land intersecting said concave raceways, two series of spherical rollers each engaging the outer raceway and one inner raceway, said rollers having ends perpendicular to the roller axes, a retainer on said land between said series of rollers and in contact with the adjacent ends of the rollers, said retainer having a plurality of spacing fingers for one series of rollers, a seat on the retainer, a ring slidably carried in the seat and a plurality of spacing fingers on said ring for the second series of rollers.

4. A cage for spherical roller bearings comprising a retainer ring having outwardly flaring side walls, a series of fingers projecting laterally from one side wall, a seat in the second side wall opposite the said fingers, a ring on said seat and of the same width, and a series of fingers projecting laterally from said ring.

5. A cage for spherical roller bearings comprising a retainer ring having outwardly flaring side walls, a series of fingers projecting laterally from one side wall, said ring being provided for approximately half of its width with a peripheral seat opposite said fingers, a ring on said seat and coextensive therewith and a series of fingers projecting laterally from said second ring.

6. A cage for spherical roller bearings comprising a retainer ring having outwardly flaring side walls, a series of fingers projecting laterally from one side wall, a seat in the second side wall opposite the inner edges of said fingers, a ring in said seat and a series of fingers projecting laterally from the said ring opposite the fingers on the first retainer ring.

7. A cage for spherical roller bearings comprising a retainer ring having outwardly flaring side walls, a series of fingers projecting laterally from one side wall, said ring being provided with a peripheral seat opposite said fingers, a ring wholly supported on said seat and a series of fingers projecting laterally from said second ring and wholly supported thereon.

8. A spherical roller bearing comprising an outer member having a spherical raceway, an inner member with two spaced depressed raceways opposite said spherical raceway, said inner member having a central land intersecting said concave raceways, two series of spherical rollers each engaging the outer raceway and one inner raceway, a retainer sliding on the land between said series of rollers, said retainer having a plurality of spacing fingers for one series of rollers, a seat on the retainer, a ring slidably carried on said seat and a plurality of spacing fingers on said ring for the second series of rollers.

References Cited in the file of this patent
FOREIGN PATENTS

| | | |
|---|---|---|
| 759,733 | France | Nov. 23, 1933 |
| 1,188,894 | France | Mar. 16, 1959 |
| 532,193 | Italy | Aug. 12, 1955 |